Jan. 20, 1953        C. W. VOGT        2,626,074
SUPPLYING SHEET MATERIAL ARTICLES
Filed June 17, 1949        3 Sheets-Sheet 1
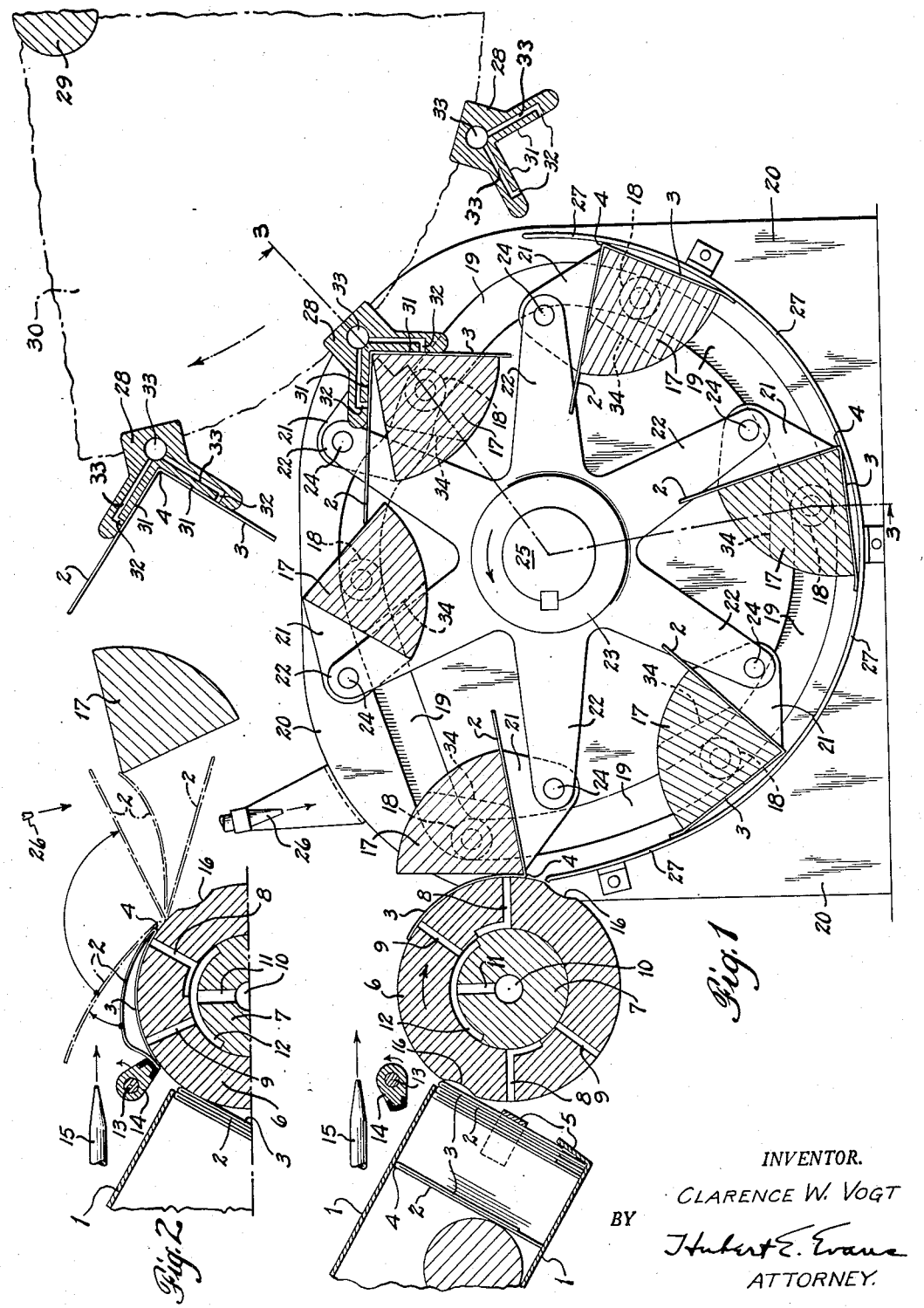
INVENTOR.
CLARENCE W. VOGT
BY
Hubert E. Evans
ATTORNEY.

Jan. 20, 1953 C. W. VOGT 2,626,074
SUPPLYING SHEET MATERIAL ARTICLES
Filed June 17, 1949 3 Sheets-Sheet 2
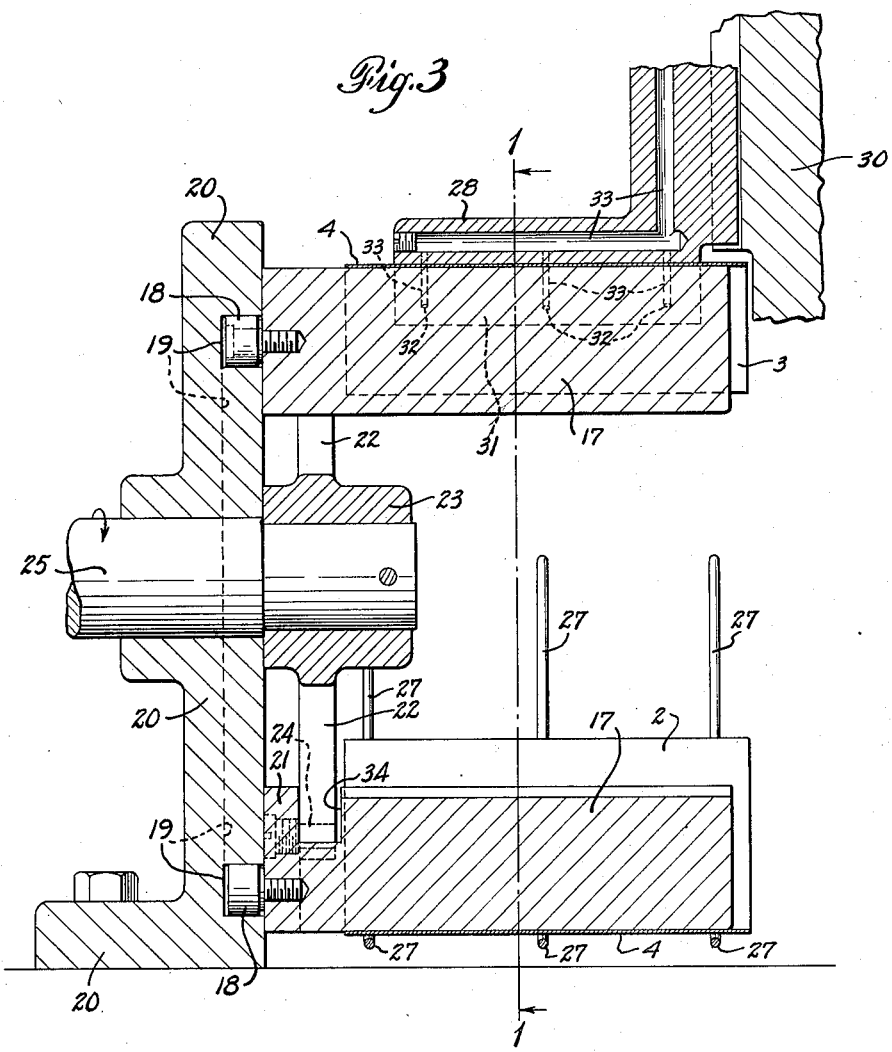
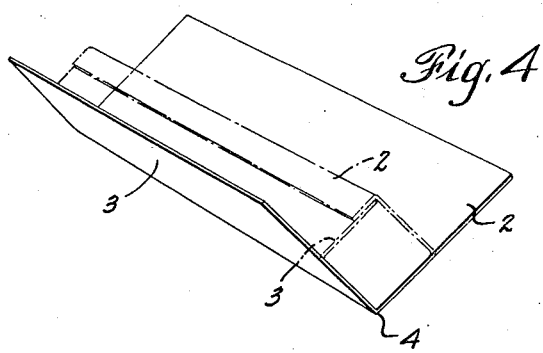
INVENTOR.
CLARENCE W. VOGT
BY
Hubert E. Evans
ATTORNEY.

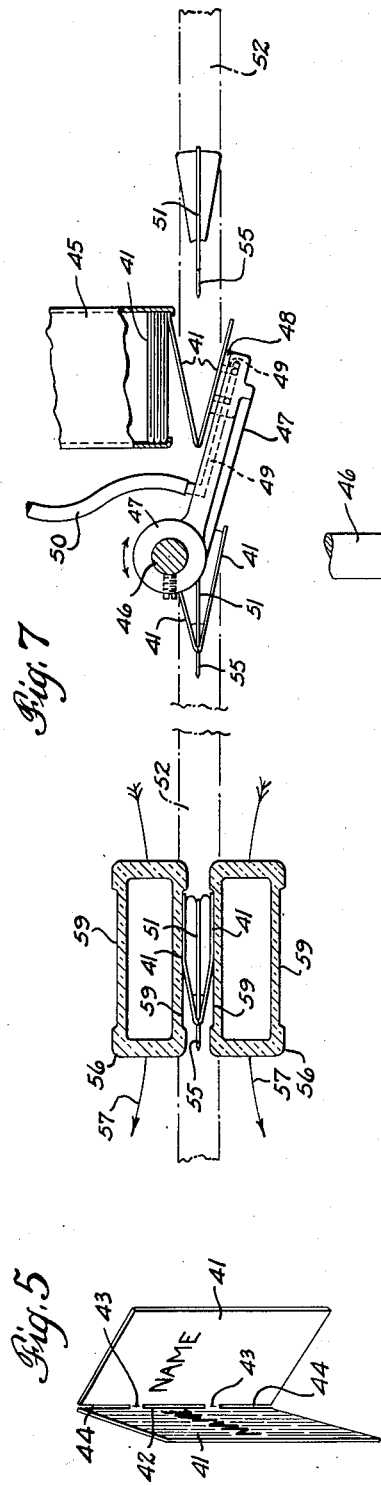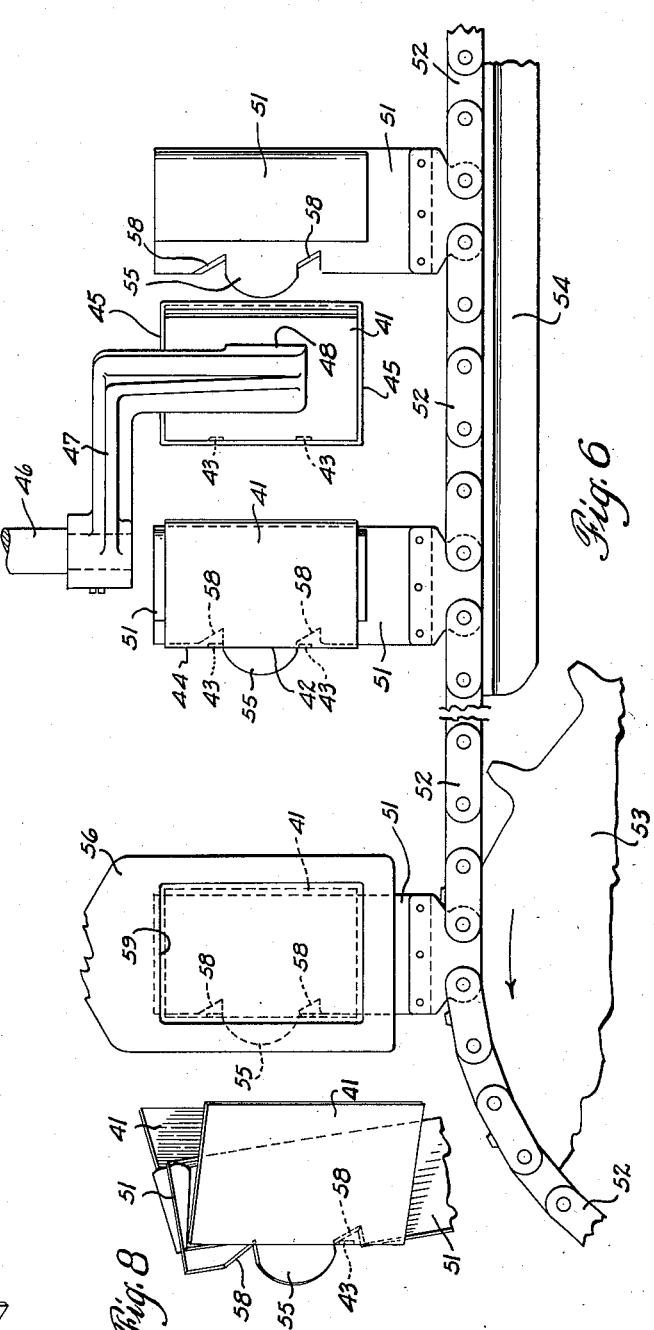

Patented Jan. 20, 1953

2,626,074

UNITED STATES PATENT OFFICE 2,626,074

SUPPLYING SHEET MATERIAL ARTICLES

Clarence W. Vogt, Norwalk, Conn.

Application June 17, 1949, Serial No. 99,611

8 Claims. (Cl. 216—55)

This invention relates to the feeding and applying of articles formed of sheet material, and in particular to the supplying of a sequence of articles from a source of supply to a position of use where the articles are applied to a precise location and position. In general the articles referred to are adapted to be used in connection with packaging and include enwrapments, labels, partial or complete bands or overwraps, and the like.

In the supplying of articles for use in packaging many such articles may be prepared in advance such as by printing and scoring, etc., with such advance preparations being incorporated in registry with the dimensions of each of the articles. However, the feeding of such articles, whether from a continuous web or individual sheets, is not closely controlled in present commercial practice, and at the position of use the articles are not applied precisely in registry. Accordingly when they are associated with a package or commodity, they are not uniformly applied and the benefit of the precise location of the preparations incorporated in the article is lost. It is therefore an object of the present invention to provide a method of and apparatus for supplying a succession of articles which may be applied to a precise position of use in registry for such use, so that the packages or commodities with which the articles are to be associated may all have a uniform appearance.

Another object is to provide a method of and apparatus for feeding and applying articles which facilitates the selection and feeding of a single article. In the selection and feeding of articles such as labels or wrappers it has been found difficult to select and feed only one article and in a number of applications when more than one article is selected and fed, serious operating difficulties are encountered. The selection of more than one enwrapment may result in damage to the wrapping mechanism and even breakdown of the wrapping equipment. In connection with the labeling of products which, due to their high cost or other characteristics, are handled in closely controlled lots, the selection and application of more than one label detrimentally affects the control of the product. To illustrate, many such labels are coded and therefore unless fed singly and in succession the coding system will be adversely affected.

A further object is to provide a method of and apparatus for supplying a succession of articles on a continuous basis to avoid stopping the feeding mechanism when it is necessary to add to the source of supply of the articles. Where such articles are being supplied for use with commodities handled on a continuous operating cycle, shutdowns in the cycle may be exceedingly costly and may appreciably affect the quality or other physical characteristics of the commodity.

Another object is to provide a method of and apparatus for feeding and applying a succession of articles which permits operation at increased speeds with a resultant increase in efficiency and lowering of cost.

A further object is to provide a method of and apparatus for supplying articles in which the articles may be obtained from a relatively compact group and may be conveyed and applied in succession with the desired spacing between adjacent articles at their position of use.

Another object is to provide a method of and apparatus for selecting a sheet material article having a folded edge portion, from a flattened sequence of articles and transferring the same to a position of use where such folded edge portion may be utilized to obtain accurate registry of the article with the position of use. In addition such folded edge portion may be utilized to obtain accurate registry of the article with the commodity to be associated therewith.

Other objects and advantages will become apparent from the following detailed description accompanied by the drawings in which:

Figure 1 is an elevational sectional view of a form of apparatus useful for carrying out the present invention shown in semi-diagrammatic form;

Fig. 2 is a view similar to Figure 1 of a portion of the mechanism shown in Figure 1 to illustrate steps in the operation of such apparatus;

Fig. 3 is a fragmentary sectional view taken substantially along line 3—3 of Figure 1;

Fig. 4 is a perspective view of an article which may be fed and applied in accordance with the present invention and illustrating how such an article may be utilized;

Fig. 5 is a perspective view illustrating another form of article for use with the present invention;

Fig. 6 is a diagrammatic elevational view of a modified form of apparatus for carrying out the present invention;

Fig. 7 is a diagrammatic plan view of the apparatus shown in Fig. 6; and

Fig. 8 is a fragmentary perspective view of a portion of the apparatus shown in Fig. 7 to illustrate one of the operations accomplished thereby.

As used in the present description the term article refers to a section of sheet material which has been fabricated to provide an enwrapment, a label, a pair of labels, a partial or complete band or overwrap, or other similar product useful in connection with packaging operations. The sheet material from which the article may be made may comprise any suitable fibrous or cellulosic, or synthetic material having sufficient flexibility to permit its use in packaging. While the sheet material is preferably of a flexible nature it may be provided with partial or complete reinforcement according to the use to which it is to be put.

In fabricated form the articles are each provided with a folded portion forming an edge of the article. An illustrative and preferred form of article comprises a square or rectangular section of sheet material having a marginal edge thereof folded over upon the remainder of the sheet material to provide a V-shaped configuration. The legs or sides of the V may be of equal or unequal length and this will depend upon the use to which the article is to be put. In the case of a wrapper the sheet material section is dimensioned to correspond to the commodity to be enclosed by the article and the apex of the V is precisely located with respect to the section of sheet material to correspond to a corner edge of the completed package. This is an extremely desirable feature since available commercial apparatus can fabricate each article so that the fold line will be in precise registry with the edge portions of the section of sheet material and further may be in precise and accurate registry with any printed matter, score lines, or other packaging aids which may be incorporated in the wrapper. Such an article also facilitates the production of a superior package, since each commodity or obect to be enwrapped thereby may be precisely and accurately deposited with respect to the edge portions of the wrapper. This may be accomplished by depositing the object or commodity to be wrapped onto the wrapper while it is in an open V configuration with a corner edge of the commodity precisely and accurately aligned with the apex of the V. Thus, each package produced will have its wrapper disposed at the same location with respect to the object and further each package may have a precisely uniform appearance since the advertising, printed matter, trade-marks, etc., will all be disposed at the same position on each package.

Fig. 4 illustrates such a V-shaped article in an open receiving position and in dash and dot outline the enwrapment has been enfolded to a tubular configuration to enclose or surround the side portions of a square or rectangular object or commodity. If the commodity has not been previously wrapped and it is desired to completely enfold the same, the wrapper may be dimensioned so that the article is disposed within the marginal edges of the wrapper and after it has been closed to tubular form suitable end folds may be made to complete the package. If the commodity has previously been provided with an enwrapment or it is not desired to completely enclose the article, it will be obvious that the article may comprise a wrap-around label or band, or may not extend completely around the periphery of the object or commodity to form a partial overwrap, or label, or brand.

During its fabrication the article may be provided on either or both surfaces with suitable score lines, fold lines, cut score lines, registry indicia, adhesive spots, stripes or areas, decorative or functional coatings, and obviously may be provided with printing, advertising matter, trade-marks, decorative embossing, or the like. Further, the article may at the time of fabrication or at the time of use be provided with suitable coding to facilitate identification of the article and the commodity with which it becomes associated. The fabricated articles may be collected to provide a source of supply by being disposed in stack of loose unconnected articles, or a plurality of adjacent articles may be secured together in pairs or in sequence as a chain of articles, or a chain of pairs of articles, or as a pack or bundle. In the interest of providing a compact supply of articles the V-shaped configuration is preferably flattened.

The present invention deals with the selection of individual articles from a source of supply, and the supplying of the articles in succession to a position of use with the article placed in condition for such use. An important feature of the invention is the fact that the articles when applied or transferred to the point of use may be accurately disposed at a predetermined position. In accordance with the present invention a single article may be selected and removed partially or completely from the source of supply. As a part of such removal or subsequent thereto the sides of the V-shaped article may be opened or spread to facilitate a gripping of the article. Preferably the mechanism which accomplishes such gripping engages the interior surfaces of the V and conveys the article to its point of utilization.

At this point the article may be transferred or applied at a predetermined location by aligning the article, and preferably its folded edge portion or apex. When the article has reached its predetermined position it may be transferred or applied to a support member which preferably receives and engages the exterior surfaces of the sides of the V. In the case of an enwrapment the receiving surfaces of the support member may have a V-shaped configuration and may carry the enwrapment to a station where the object or commodity to be enwrapped may be deposited. In the case of labels the receiving surface or surfaces may be a portion of the object or commodity with which the label is to be associated.

Figs. 1, 2, and 3 illustrate in somewhat diagrammatic form a mechanism for selecting, feeding, and applying a succession of V-shaped articles. The numeral I indicates a magazine adapted to contain a plurality of articles in sequence which comprise a source of supply. The particular form of article is a rectangular section of sheet material folded to a V-shaped configuration with a side 2 of the V having a greater length than the side 3 of the V. In Figure 1 the fold line or apex of the V, indicated by the numeral 4, is disposed in an upward position and the magazine is inclined at a desirable angle to facilitate the feeding of the articles. The face or leading side of the tray I is substantially open and the articles may be retained therein by lips or flanges 5 which project partially or completely across the open face.

Mounted adjacent the tray I may be a rotary transfer member or wheel 6 which revolves about a stationary shaft 7. The periphery of the transfer wheel 6 moves past the article exposed at the open face of the tray and engages the leading one of such articles preferably in the region of the apex. At the desired periodic intervals the transfer wheel may be provided with radially disposed passages or ports 8 and 9 from which air may be exhausted to provide a vacuum so as to grip and withdraw the leading article from the sequence. Where the size of the article makes it desirable, two vacuum passages may be provided to grip opposed edges of the article to insure that it will be securely held without slippage on the periphery of the transfer wheel. For example, a passage or axially spaced passages 8 may engage the leading edge of an article while a passage or axially spaced passages 9 may engage the trailing edge of the article as the transfer wheel rotates sufficiently to bring it into engagement therewith. Air may be withdrawn from the passages 8 and 9 through the stationary shaft 7 by a suitable vacuum pump (not shown). The stationary shaft 7 may be provided with an axial passage 10 which communicates through one or more openings 11 with one or more slots 12 formed in the periphery of the stationary shaft. Then during rotation of the transfer wheel 6 air will be exhausted from the passages 8 and 9 during the time that they are in communication with the slot 12 in the periphery of the shaft 7.

It may be noted that as the passage 8 on the lefthand side of the transfer wheel 6, looking at Figure 1, approaches the apex 4 of the leading article in the tray, the passage 8 becomes aligned with the slot 12 and air is exhausted from the passage 8. This causes the transfer wheel to grip the side 3 of the leading article in the region of its apex and slide it from the tray 1. The top wall of the tray 1 extends a proper spaced distance from the transfer wheel to retain the balance of the articles therein. Similarly the passage 9 on further rotation of the transfer wheel moves into engagement with the trailing portion of the side 3 of the article to hold it to the periphery of the transfer wheel. This is because as the passage 9 engages the article it becomes aligned with the slot 12 and air is withdrawn therefrom through the opening 11 and the passage 10. Since the article is of a double thickness with the side 3 thereof held to the curved periphery of the transfer wheel, there will be a natural tendency for the side 2 of the article to remain in a plane and not conform to the curvature of the transfer wheel 6. This commences an opening or diverging of the sides of the V-shaped article and further divergence of the side walls may be accomplished in any desired manner. The drawings illustrate one manner of accomplishing this result.

Figs. 1 and 2 illustrate a shaft 13 mounted for rotation adjacent the transfer wheel 6 and the tray 1. The shaft 13 may have affixed thereto one or more eccentric members or scuffers 14 which rotate at a faster speed than that of the transfer wheel and come into close engagement with the periphery of the transfer wheel during each revolution of the shaft 13. The tip portion of the scuffer member 14 may be made of a material which is both resilient and have increased gripping action such as a relatively soft rubber, sponge rubber, or the like. The scuffer member 14 is positioned and driven in timed relation with the transfer wheel 6 causing it to engage the side 2 of the V-shaped article adjacent its free edge. As the scuffer member rotates faster than the transfer wheel it will slide the side 2 of the article with respect to the side 3 causing it to bow outwardly and pivot about the apex 4 of the V. This insures a separation of the two sides of the V and in effect throws the free edge of the side 2 outwardly from the periphery of the transfer wheel (see Fig. 2). At this point the side 2 of the article may be caught in a continuous or intermittent air blast emanating from a nozzle member 15 mounted adjacent the scuffer. The air blast may be a series of individual blasts or may be continuous for a considerable portion of the extent of the article causing a divergency of the sides of the V as is clearly indicated by the successive dot and dash positions of the side 2 illustrated in Fig. 2.

As shown in the drawings, the transfer wheel 6 has two stations each of which may select and withdraw an article from the tray 1. Since the scuffer member 14 is rotating at a higher speed it would engage the transfer wheel and possibly interfere with the rotation thereof at points where no article has been withdrawn by the transfer wheel. Accordingly, the periphery of the transfer wheel may be relieved at these points to permit clearance between the scuffer member and the transfer wheel. These relieved portions on the periphery of the transfer wheel are indicated by the numeral 16. Further, since the side 2 of the article is of greater extent than the side 3, and since the scuffer member slides the free edge of the side 2 over the side 3 it may be desirable to provide a recess in the periphery of the transfer wheel to an extent equal to the thickness of the side 3 of the article to provide a smooth surface along which the scuffer member may slide the free edge portion of the side 2 of the V.

After the transfer wheel 6 has picked an article from the tray 1 and caused a divergence of the sides of the V-shaped article, the article may be engaged and gripped by a member or plow 17 having a pair of diverging surfaces adapted to contact the interior surfaces of the article. The members 17 are thus generally triangular shaped in cross section and extend for approximately the full extent of the article. At one end the member 17 carries a roller follower 18 disposed in a cam track 19 of a suitable stationary disc cam member 20. Adjacent the cam member 20 the plow member 17 carries an extension or ear 21 by which the plow member is linked to an arm 22 of a driven spider 23. Fig. 3 illustrates a pin 24 carried by the ear 21 and journaled in the end of the arm 22 of the spider 23. The spider member 23 may be carried for rotation by a driven shaft 25 which may be journaled in the stationary cam member 20. As the shaft 25 rotates, the plurality of arms 22 carried thereby advance the plurality of plow members 17 in a generally circular path. However, the disposition of the cam track 19 permits the plow members to pivot about their connection with the ends of the arms 22. The pivotal or oscillating movement of the plow members while they are being driven permits a variation in the direction in which the apex of the plow member may face, which may be used to advantage in picking up and depositing the articles. The pivotal movement of the plow members may be sufficiently great that at some points in their operating cycle it may be desired that they overlap or interfit with the arms 22 of the spider 23. Accordingly the plow members 17 may be recessed as indicated by the numeral 34 so that they may interfit with end portions of the arms 22. As may be seen in Figure 1 the spider 23 and its associated mechanism provide a succession of six plow members 17 to engage articles carried by the transfer wheel and convey them to their point of use.

After the air jet from the nozzle 15 has opened the V-shaped article, a second air jet from a nozzle 26 which may be mounted on the cam member 20 acts upon the side 2 of the article to create a further divergence of the V-shaped article and advance the side 2 in front of the apex of the angularly disposed sides of an approaching plow member 17 as indicated in Fig. 2. Just prior to the point where the apex of the plow member 17 contacts the article, the cam track 19 causes the plow member to pivot so that the apex of the plow engages the inside portion of the apex of the article and further movement of the plow member pulls the side 3 of the article from the transfer wheel. From Figure 1 it may be noted that at approximately the time that the apex of the plow is in contact with the apex of the article the passage 8 of the transfer wheel is no longer in communication with the slot 12 of the shaft 7 and the leading edge of the article is no longer held to the transfer wheel 6. Continued movement of the shaft 25 advances the plow member 17 and simultaneously the transfer wheel moves and brings the passage 9 past the end of the slot 12. This breaks the communication of the passage 9 with the vacuum and releases the trailing edge of the side 3 of the article so that the article is now free to move with the plow member 17. At approximately this same time the article may be held to the plow member by one or more stationary wires or ribbons 27 supported from the face of the cam member 20. Due to the arcuate disposition of the wires 27 the article may be held to the plow members at the apex of the article and at the trailing edge of the side 3 of the article.

The plow members 17 with the aid of the wires 27 support and convey the articles in a spaced succession to a point where they may be transferred for use. Figure 1 illustrates a plurality of support members 28 mounted for movement about a shaft 29 and carried by a structure 30, a broken outline of which is indicated by dot and dash lines in Figure 1 since the structure is disposed above the plane of the section represented in Figure 1.

As the plow members 17 move around the shaft 25 from the transfer wheel 6, in a counterclockwise direction looking at Fig. 1, the curvature of the cam track 19 pivots the plow members about the ends of the arms 22 so that the apex of the plow member is disposed in an outward direction with respect to the shaft 25. In this position the plow members bearing the V-shaped articles mesh with the V-shaped reentrant receiving surfaces 31 of the support members 28. It may be noted that the apex of the V-shaped article may be precisely and accurately applied at the predetermined transfer spot which in the form shown, is the apex of the V-shaped receiving surfaces 31. This step in the supplying of a succession of articles is important since every article due to its having a folded edge portion may be accurately aligned at a predetermined position facilitating its utilization.

If desired the receiving surfaces 31 of the support members 28 may be provided with vacuum ports indicated by the numeral 32 leading to air passages 33 extending through the support members to a suitable vacuum pump. This will insure a secure gripping of the article by the support member and the maintenance of the precise alignment of the article with the support member. To assist in the transfer of the V-shaped article from the plow member 17 to the support member 28, the plow member may have its angularly directed surfaces disposed at a decreased angle as compared to the V-shaped surfaces 31 of the support member. Also the cam track 19 of the cam 20 may be curved so that the plow member 17 in its meshing action with the support member applies one side of the V-shaped article to one of the receiving surfaces 31 and then applies the other side of the V-shaped article to the other of the receiving surfaces 31. Continued movement of the support members 28 and the plow members 17 results in a disengagement of these members and the cam track 19 may be curved to pivot the member 17 and permit its exit from between the V-shaped surfaces 31 of the support member without disturbing the registry of the article now securely gripped by the support member. The support members move the articles to their utilization point. For example, if the articles are wrappers they may be advanced to a point where an object or commodity is deposited therein. Also, continued movement of the plow members 17 advances them into position where they may engage and convey additional articles from the transfer wheel.

It may be seen that Figs. 1, 2, and 3 show an embodiment of the present invention, and for purposes of illustration it may be considered that the articles handled by the mechanism described in connection with these figures are enwrapments which are fed and supplied from a sequence to a point of utilization in succession where they may be associated with a commodity or object for packaging such commodity or object. Figs. 6 and 7 show in diagrammatic form a modified construction embodying the present invention. For purposes of illustration it may be considered that the V-shaped article being supplied in this case is a label or a pair of labels. Further, to explain the adaptability of the present invention it may be assumed that in Figs. 1 through 3 the V-shaped enwrapments are handled with their apices disposed in a horizontal plane or in a plane at an acute angle to the horizontal. In connection with Figs. 6 and 7 it may be considered that the V-shaped articles are handled with their apices disposed in a generally vertical plane or a plane at some acute angle thereto.

Fig. 5 illustrates a V-shaped article adapted to be handled on the mechanism shown in Figs. 6 and 7. Such an article may comprise a section of sheet material having an edge portion folded to a V-shaped configuration with the sides of the V of substantially equal length. In the form shown, each side 41 may have a square or rectangular configuration, since this is a conventional shape for articles such as labels. Obviously, however, many other shaped articles may be utilized in connection with the present invention. Further each side of the V-shaped article constitutes a single label so that by the present operation the handling of a single article in reality may be the handling of two labels.

In Fig. 5 the sides of the article are shown in divergent form to disclose the interior surfaces of the article where it may be seen that appropriate labeling or advertising information, trademarks, etc., may be located. The exterior surfaces of the article may, if desired, be coated in advance with a suitable adhesive material and may have an over-all coating or may have an appropriate pattern of adhesive areas such as stripes, spots, or the like. An especially desirable adhesive for securely bonding the labels to an object or commodity may comprise a thermoplastic adhesive. Such an adhesive obviates the handling problems incurred with adhesives or glues which are rendered tacky by water or other suitable solvents. Also, thermoplastic adhesives may be made in a form known as "delay action" type which means that the adhesive remains tacky for an appreciable time period after it has been heated to its activation point. Thus the adhesive may be activated and the label may then be conveyed for an appreciable distance before it engages the object or commodity to which it is to be affixed, and when applied will adhere with an excellent bond. Also, where the containers to which the labels are to be applied are reuseable, the labels may be readily removed by activating the adhesive and peeling the label to remove the same.

To facilitate separation of the article into two individual labels, the apex of the V-shaped article which comprises the common boundary between the two labels, may be prefabricated in a suitable manner. For example, the apex of the article may be provided with a central slit 42. Outwardly therefrom the two sides 41 may be connected by integral lands or connecting portions 43 and if desired the end portions of the apex may be provided with end slits 44. This particular form of detachable connection is considered desirable because the edge portions of a label should be clearly defined to provide a desirable appearance rather than being jagged or uneven. Most preweakened lines such as those obtained by cut scoring, perforating, or the like, result in rough or serrated edge portions when finally severed. In the form of detachable connection shown in Fig. 5, a substantially sharp boundary may be obtained by accomplishing the final severance at the desired point with a tool having a central unsharpened or dull projection which may act as a finder and will enter the central slit 42. With the tool thus aligned with the common boundary, a pair of angularly disposed cutting edges which are situated outwardly of the central projection or finder may accomplish the severance of the connecting portions 43. The purpose of preforming the end slits 44 is to avoid any tearing action of the corner portions of the common boundary and insure sharp corners.

As described in connection with Figs. 1, 2, and 3, the articles may be disposed in a sequence such as a stack, pack, or bundle to provide a source of supply. In Figs. 6 and 7 the numeral 45 indicates a box or other container for holding a source of supply from which the articles may be withdrawn. Disposed above the source of supply is an oscillating shaft, a portion of which is indicated by the numeral 46. The shaft 46 carries a depending bracket member 47 which terminates in a contact member 48. As the shaft oscillates it swings the contact member 48 into and out of engagement with the face of the container 45. The supply of articles may be maintained with a slight pressure so that they will automatically move toward the face of the box as articles are withdrawn. To grip a side 41 of the leading article the contact member and bracket may contain passages 49 so that air may be withdrawn from the face of the contact member to cause it to grip a side of the leading article. The passages 49 may be connected with a suitable vacuum pump through a flexible conduit 50. As the contact member engages a side of the leading article such side is gripped by the vacuum and movement of the contact member away from the container 45 will pull the leading side of the article from the container and will also serve to disengage the apex of the article and advance it outwardly from the container.

This position of the article is illustrated in Fig. 7 and at this point the article may be engaged by a member 51 similar in function to the plow member 17 in the form of the invention shown in Figs. 1 through 3. The member 51 comprises a centrally disposed blade portion and has divergent side surfaces adapted to engage the interior surface of the article. The member 51 may be one of a series of similar members which may be carried by a single chain conveyor 52 which may be entrained around a pair of spaced sprockets one of which is indicated by the numeral 53 in Fig. 6. The conveyor travels in a path calculated to cause the members 51 to move past the container 45 to grip and carry away the divergent articles held by the contact member 48. During this movement of the conveyor it may be guided and supported by a support member 54. The vacuum causing the contact member 48 to grip a side of the article may be controlled so that as the member 51 engages and picks up the article, such vacuum is released. Since the movement of the side of the article from the contact member, under the control of the member 51 is in a substantially tangential direction it may not be necessary to interrupt the vacuum. In other words, while the vacuum may be adequate to grip the sides of the article for movement in a direction generally normal to the face of the contact member, the article may be slipped along the face of the contact member due to its engagement by the member 51.

The articles are conveyed by the members 51 is succession to a position of use and at this point may be transferred or applied. If the exterior surfaces of the article have not been coated with adhesive material this may be done by conventional mechanism for applying an activated adhesive to such surfaces. However, if the articles have been previously coated with a thermoplastic adhesive such adhesive may be activated during movement of the articles in any suitable manner. For example, the members 51 may be provided with heaters to activate the thermoplastic adhesive or heat may be applied from an external source such as infra red lamps or the like to activate the adhesive on such exterior surfaces. It may be noted that the members 51 are provided with a generally rounded projection 55 which may securely hold the article by entering and engaging in the central slit 42 along the apex of the article. At the point of use the divergent V-shaped articles may be applied to a suitable receiving surface. In the drawings the receiving surface is illustrated as a pair of bottles 56 which move in a converging path indicated by arrows 57, and contact the exterior surfaces of the article from each side while it is still held by the member 51. Since the member 51 holds the article and advances it the point of contact with the bottles 56 may be precisely regulated at a predetermined position so that the articles or labels may be uniformly applied to each of a succession of bottles or other containers. At approximately this location the chain conveyor 52 and the members 51 begin to move in an arcuate path around the sprocket 53. This increases the linear speed of points on the members 51 spaced outwardly from the axis of rotation of the sprocket. With the article adhering to the bottles 56, an increase in the linear speed of the member 51 will cause sharpened edges 58 thereof, disposed above and below the projection 55, to sever the connecting portions 43 of the common boundary between the sides of the article. Such action is illustrated best in Fig. 8.

After severance of the articles into two individual labels the bottles or containers may move in divergent paths as indicated in Fig. 7. To facilitate pressing the individual labels against each of the objects to which they are to be applied, it is believed preferable that the portions of the member 51 which form the diverging side surfaces, be made of a suitable resilient material such as a soft rubber, a sponge rubber, or the like. Then as the labels are applied the converging path of the bottles 56 may cause a compression of the member 51 to firmly bond the labels to the bottles. Obviously the pressing of the labels against the receiving surfaces could be accomplished by separate means after the labels have been applied.

It may also be noted that the labels, due to their precise and accurate application may be applied to a predetermined portion of the surface of the object or commodity. For example, the drawings illustrate the bottles 56 as being provided with recessed surfaces 59 to which it is desired that the labels be applied. Further, it will be obvious that labels may be applied to irregularly shaped objects such as cans, boxes, or other containers of varying shapes and sizes. It is only necessary to provide a suitable supporting and conveying means to move the objects in a path which adjoins the path of the labels. The objects to which the articles are to be applied may be upright which is advantageous in the labeling of some containers prior to filling or sealing.

Where each article comprises a pair of labels and the feeding and applying is carried out at speeds of present day commercial equipment, the production of completed articles is doubled since they are handled as pairs. Similar increases in production may be obtained in partially or completely banding or overwrapping of the various objects. For example, it is contemplated that articles such as are shown in Fig. 2 of my copending application, Serial 79,591 filed March 4, 1949, and entitled Receptacle, may be provided with a suitable overwrap which may extend across the open face of the receptacle and down the adjacent sides. This type of partial overwrap is exceedingly beneficial in conserving on the amount of sheet material required for an overwrap. Further, it may be adequately protective since it may be bonded to the receptacle along all of its marginal edges. If made of a transparent sheet material it will not obstruct a prominent display of the objects contained in the receptacle, and lends itself to application in accordance with the present invention. Once the pair of overwraps have been applied and adhered to the receptacles in registry, the completion of the bonding of the article to the receptacle may be readily accomplished.

As has been previously stated the source of supply of articles may comprise a stack of loose individual articles which can be readily inserted at the rear of the source of supply in the containers for the articles shown in the drawings. To facilitate handling the stacks may be bundled by tapes which may be removed when a fresh supply is added to the container. It is also contemplated that a plurality of articles disposed in a stack may be detachably connected together by a suitable adhesive so that the articles may be handled as a pack or chain. The adhesive may be coated or printed on the articles at the time of fabrication and if a thermoplastic adhesive is used, heating means may be incorporated in the tray or box 1 shown in Figs. 1 and 2. Such heating means may activate the adhesive to tacky condition and thus when the articles are removed from the source of supply they will be readily peeled or separated from adjacent articles. The feeding of articles in accordance with the present invention facilitates continuous operation in the use of the articles since the source of supply may be replenished without shutting down the feeding mechanism. If the articles comprising the source of supply are detachably connected together, additions to the supply may also be connected together and to the supply. When a thermoplastic adhesive is utilized the adhesion area on the leading article in the replenishment sequence may be activated and adhered to the last article of the supply.

It will also be understood that the presently described method and apparatus insures the supplying of single articles in sequence and at the desired spacing for proper utilization. The number of stations and spacing of the selecting and advancing means may be varied to correspond with that desired at the point of utilization. Also, the driving means for various portions of the mechanisms shown and described may cause them to move with continuous or intermittent motion. The use of appropriate gearing and Geneva drive mechanisms, as well as linked gear trains, such as that disclosed in Fig. 11 of my copending application Serial No. 56,941, filed October 28, 1948, and entitled Apparatus for and Method of Chaining Enwrapments, will provide a wide variety of intermittent cycles. By way of illustration, it may be desired that the transfer wheels 6 in Figs. 1 and 2 hesitate at the point where an enwrapment is selected and gripped, or at the point where the enwrapment is transferred to the plow member 17, or both.

The feeding and applying of a sequence of single articles in succession is of primary importance in many applications where the articles may constitute a control due to their having been coded or where the feeding and applying of more than a single article would damage the apparatus which utilizes the articles. Another valuable feature of the present invention for handling articles having a folded edge portion resides in the fact that the articles may be handled and applied in precise registry for use by aligning the folded edge portion with a predetermined position. In the handling of relatively light sheet materials, registry thereof has presented difficult problems which may be solved by the use of the present invention.

It will be understood that the foregoing description of preferred embodiments of the invention is for the purpose of explanation and illustration and numerous variations and modifications other than those which have been described may be made without departing from the spirit of the invention.

What I claim is:

1. Apparatus for successively feeding and applying sheet material articles having a folded edge portion which comprises a support for a plurality of said articles, means for withdrawing the leading one of said articles and opening said folded portion to divergent position, a movable member to enter and engage interior surfaces of said folded portion, and receiving surfaces to receive said article and remove it from said movable member for use.

2. Apparatus for supplying a succession of V-shaped sheet material articles which comprises means for successively withdrawing said articles singly from a source of supply and opening the sides thereof to divergent position, a plurality of members each movable in a common closed path to engage and convey, respectively, said articles and each having diverging surfaces in contact with each of the interior surfaces of said divergent articles, and a plurality of receiving means each having generally complementary reentrant divergent receiving surfaces and being movable to a predetermined position to receive an article for use.

3. In apparatus for feeding and applying V-shaped articles, a unitary movable member having divergent surfaces to support articles having divergent surfaces by engagement of the divergent surfaces with interior surfaces thereof, and means forming converging reentrant receiving surfaces to which said article is conveyed by said movable member, and means for transferring said article to said receiving surfaces with said article at a predetermined position with respect to said receiving surfaces.

4. The method of supplying a sequence of sheet material articles having a folded edge portion which comprises withdrawing one of said articles from a plurality thereof, holding one side of the article, advancing the article with said folded edge leading, opening the unheld side of the article, exerting a force upon the open surfaces of the article, and applying said article by positioning said folded edge portion against a predetermined location on a receiving member with the sides held in open position.

5. The method of feeding a supply of sheet material articles each having a folded portion with the fold line forming an edge portion of the article which comprises withdrawing an article from a sequence of such articles, opening the folded article, engaging interior opened surfaces of said folded portion, conveying said article while engaging said interior surfaces, and transferring said article by applying exterior surfaces of said folded portion while the interior surfaces thereof are engaged to receiving surfaces in predetermined relationship with respect to said receiving surfaces.

6. The method of supplying a succession of articles having a folded portion which comprises successively withdrawing single ones of said articles from a sequence of said articles in flattened condition, successively conveying said articles, successively opening the folded portions of said articles to divergent position and successively applying the exterior surfaces of said articles to generally complementary receiving surfaces while being supported on the interior surfaces thereof.

7. The method of supplying V-shaped articles which comprises gripping and withdrawing a leading one of said articles from a sequence of said articles, opening the sides of said V-shaped article to divergent position, and applying the exterior surfaces of said article to generally complementary receiving surfaces while supporting the articles on the interior surfaces thereof with the apex of said V-shaped article at the intersection of the planes of said receiving surfaces.

8. The method of supplying a succession of folded wrappers which comprises picking a single wrapper from a stack thereof, supporting said wrapper with the sides thereof held in divergent relationship, conveying said wrapper by engaging the interior surfaces thereof by a single carrying member, applying the exterior surfaces of said wrappers to a member having receiving surfaces generally complementary to said exterior surfaces while supporting the interior surfaces thereof, and holding the wrapper to said receiving surfaces.

CLARENCE W. VOGT.

REFERENCES CITED

The following references are of record in the file of this patent:

UNITED STATES PATENTS

| Number | Name | Date |
|---|---|---|
| 2,195,111 | Kagley | Mar. 26, 1940 |
| 2,219,608 | Ackley | Oct. 29, 1940 |
| 2,461,573 | Schweizer | Feb. 15, 1949 |
| 2,507,281 | Spisak | May 9, 1950 |